United States Patent
Muldoon et al.

(10) Patent No.: US 10,312,517 B2
(45) Date of Patent: Jun. 4, 2019

(54) IN SITU FORMATION OF SULFUR PARTICLES USING ORGANIC ACIDS IN THE PRESENCE OF POLYMER FUNCTIONALIZED CARBON

(71) Applicant: Toyota Motor Engineering & Manufacturing North America, Inc., Erlanger, KY (US)

(72) Inventors: John Muldoon, Saline, MI (US); Claudiu B. Bucur, Ypsilanti, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 124 days.

(21) Appl. No.: 15/339,224

(22) Filed: Oct. 31, 2016

(65) Prior Publication Data
US 2018/0123133 A1    May 3, 2018

(51) Int. Cl.
| | | |
|---|---|---|
| *H01M 4/60* | (2006.01) | |
| *B01J 13/06* | (2006.01) | |
| *H01M 4/04* | (2006.01) | |
| *H01M 4/36* | (2006.01) | |
| *H01M 4/38* | (2006.01) | |
| *H01M 4/62* | (2006.01) | |
| *H01M 4/13* | (2010.01) | |
| *H01M 4/139* | (2010.01) | |
| *H01M 10/052* | (2010.01) | |
| *H01M 4/02* | (2006.01) | |

(52) U.S. Cl.
CPC .............. *H01M 4/604* (2013.01); *B01J 13/06* (2013.01); *H01M 4/0497* (2013.01); *H01M 4/13* (2013.01); *H01M 4/139* (2013.01); *H01M 4/366* (2013.01); *H01M 4/38* (2013.01); *H01M 4/382* (2013.01); *H01M 4/622* (2013.01); *H01M 4/623* (2013.01); *H01M 4/625* (2013.01); *H01M 10/052* (2013.01); *H01M 2004/021* (2013.01); *H01M 2004/028* (2013.01); *H01M 2220/20* (2013.01); *Y02E 60/122* (2013.01); *Y02T 10/7011* (2013.01)

(58) Field of Classification Search
CPC ......... H01M 2004/028; H01M 4/0497; H01M 4/366; H01M 4/38; H01M 4/604; H01M 4/623; H01M 4/625
See application file for complete search history.

(56) References Cited

U.S. PATENT DOCUMENTS

| | | |
|---|---|---|
| 6,908,706 B2 | 6/2005 | Choi et al. |
| 8,980,471 B2 | 3/2015 | Muldoon et al. |
| 2012/0251889 A1* | 10/2012 | Janssen .................. H01B 1/122 429/231.8 |
| 2013/0164625 A1 | 6/2013 | Manthiram et al. |
| 2014/0234707 A1* | 8/2014 | Muldoon .............. H01M 4/622 429/211 |
| 2014/0255770 A1 | 9/2014 | Lee et al. |
| 2015/0072248 A1* | 3/2015 | Watanabe ............... H01M 4/38 429/336 |
| 2015/0162596 A1 | 6/2015 | Dadheech et al. |
| 2015/0236343 A1 | 8/2015 | Xiao et al. |
| 2015/0325850 A1 | 11/2015 | Jang et al. |
| 2015/0340688 A1 | 11/2015 | Rhee et al. |
| 2016/0087266 A1 | 3/2016 | Muldoon et al. |

FOREIGN PATENT DOCUMENTS

WO    WO-2015136197 A1 *   9/2015 ............. C01B 17/00

\* cited by examiner

*Primary Examiner* — Stewart A Fraser
*Assistant Examiner* — Victoria H Lynch
(74) *Attorney, Agent, or Firm* — Oblon, McClelland, Maier & Neustadt, L.L.P.

(57) ABSTRACT

A sulfur particle containing a core of elemental sulfur having homogeneously dispersed particles of a conductive carbon and branched polyethyleneimine; and a coating of branched polyethyleneimine (bPEI) encapsulating the core is provided. In the sulfur particle the dispersed particles of conductive carbon are associated with the bPEI. A cathode having an active material containing the sulfur particles and a sulfur loading of 1.0 mg S/cm$^2$ to 10 mg/cm$^2$ and a battery containing the cathode are also provided.

20 Claims, 7 Drawing Sheets

IN SITU FORMATION OF SULFUR PARTICLES USING ORGANIC ACIDS IN THE PRESENCE OF POLYMER FUNCTIONALIZED CARBON

BACKGROUND

Field of the Disclosure

This disclosure is directed to sulfur particles embedded with conductive carbon and a cathode active material containing sulfur particles which can be suitable for producing cathodes of high sulfur areal loading. Thus the present disclosure is also directed to a cathode having a high areal sulfur loading for a metal ion battery and a metal ion battery containing the cathode.

Discussion of the Background

An ongoing objective in the commercial development of electric vehicles and portable electronics is to provide batteries with higher energy densities than currently available with state of the art lithium ion batteries. One approach in achievement of this objective is to couple a metal anode, such as lithium or magnesium, with a high capacity conversion cathode, such as sulfur or oxygen, without sacrificing cycle life and rate capability. Sulfur is highly attractive because it is economical, highly abundant and offers a charge capacity that is an order of magnitude higher than conventional insertion lithium ion cathodes. However, sulfur is electrically insulating and exhibits unacceptably high mass loss during cycling due to the formation of polysulfide reduction intermediates which are highly soluble in an electrolyte and do not return to the cathode during a recharge cycle.

Thus, although elemental sulfur has been under investigation as a cathode active material in conjunction with metal anodes for more than 50 years, in order to obtain viable commercial sulfur cathode energy storage and supply source, these two fundamental challenges must be overcome. The first challenge is to enhance the conductivity of elemental sulfur. Unlike commercial lithium ion cathodes ($LiCoO_2$) which possess a high electronic conductivity and do not require significant addition of conductive additives, sulfur is an effective insulator which is 1 billion times less conductive than $LiCoO_2$. Therefore, in order to prepare a viable and commercially useful battery based on elemental sulfur cathode active material conductive additives are included as a component of the active material composition.

The second challenge is to control the diffusion and subsequent loss of polysulfide intermediates formed during cycling. During discharge, sulfur reduces in a stepwise manner by forming a series of polysulfide intermediates which are ionic in nature and solvate easily in the electrolyte. This causes mass loss of active material upon cycling.

To date the technical approaches taken to address and solve these two fundamental challenges have resulted in diminished charge capacity in comparison to the theoretical value of sulfur such that the desired improvement is not obtained.

Thus, the result of adding high loadings of conductive additives to improve the overall electronic conductivity is low sulfur content in the cathode and corresponding reduction of energy capacity. A second problem is the slow rate of operation due to the low electronic conductivity of sulfur and the low ionic conductivity of the reduced product, $Li_2S$. Third, the diffusion of ionic polysulfides limits cycle life due to anode passivation and mass loss from the cathode.

Extensive research efforts have been devoted to developing methods to enhance the conductivity of elemental sulfur and to control the diffusion of polysulfide intermediates formed during cycling. Conductive hosts infused with sulfur and polymer-coated sulfur composites have been studied since Nazar demonstrated infusion of sulfur into ordered mesoporous carbon. Various micro/nano carbon hosts including spheres, nanofibers, graphene oxide and carbon paper, have been investigated as conductive hosts to contain the sulfur active material (Nazar et al. Nature Materials, 2009, 8, 500-506). A microporous carbon interlayer with pore sizes matching the dimensions of the polysulfide ions has been described (Manthiram et al. Nature Communications, 2012, 3, 1166). Sulfur has also been infused into metal organic frameworks (MOF) in order to improve conductivity by interaction between the polysulfides and the MOF oxide surface (Tarascon et al. Journal of the American Chemical Society, 2011, 133, 16154-16160). Although these systems have shown some improvement in the conductivity of the sulfur cathode, diffusion of polysulfides out of the host pores continues to be a problem and limited cycle life results. Further, because a carbon matrix is employed to enhance conductivity of the sulfur capacity of the cathode is decreased due to dilution.

In U.S. application Ser. No. 14/489,597, filed Sep. 18, 2014, the present research group has described encapsulated sub-micron sulfur particles formed in the presence of a mixed hydrophilic/hydrophobic copolymer. The resulting encapsulated sulfur sub-micron core particle is coated with a membrane of layers of self-assembling conductive polymer layers, each successive layer having a charge opposite to the previous layer. Carbon black functionalized as described in U.S. Ser. No. 14/985,170, filed Dec. 30, 2015, may be dispersed in the sulfur core or associated with an outermost conductive polymer layer. However, the special functionalization of the carbon requires extra processing and involves the use of toxic and corrosive chemicals.

In U.S. Ser. No. 14/983,763, filed Dec. 30, 2015, the present research group described a sulfur active material of a hybrid particle having a core of a hybrid composite comprising at least two elements selected from sulfur, selenium and tellurium; and a coating of at least one self-assembling polymeric layer encapsulating the core.

Although each of the above described sulfur active materials has provided incremental improvement in capacity and cycle lifetime, significantly greater improvement is necessary in order to produce commercially viable metal-sulfur batteries.

Conventionally, the sulfur cathodes as described above operate at sulfur loadings of around 1 $mg/cm^2$ and capacities greater than 1000 mAh/g are not obtained.

Thus, there is a need for a sulfur active material which allows for complete utilization of sulfur at high loadings per $cm^2$ while having a balance of high capacity and good conductivity.

An object of the present disclosure is to provide an elemental sulfur composite which provides high sulfur loading and utilization as a cathode active material.

A second object of the present disclosure is to provide a cathode containing an active material which allows for high sulfur loading and utilization and is suitable for utility in a battery having high capacity and high cycle lifetime.

A third object of the disclosure is to provide a battery which has sufficient capacity and lifetime to be a viable commercial energy source for electronic devices.

SUMMARY OF THE DISCLOSURE

These and other objects have been achieved by the present disclosure, the first embodiment of which includes a sulfur particle, comprising: a core of elemental sulfur comprising homogeneously dispersed particles of a conductive carbon and branched polyethyleneimine; and a coating of branched polyethyleneimine (bPEI) encapsulating the core; wherein the dispersed particles of conductive carbon are associated with the bPEI of the elemental sulfur core.

In one aspect of this first embodiment the content of the conductive carbon in the elemental sulfur core is from 0.01 to 1.0% by weight of a total weight of the elemental sulfur core.

In a further aspect of the first embodiment the conductive carbon may also be on the bPEI coating of the sulfur particle and the total content of conductive carbon within the elemental sulfur core and on the bPEI coating may be from 0.01 to 5.0% by weight of the total weight of the sulfur particle.

In a second embodiment, the present invention provides a method for preparing the sulfur particle of the first embodiment, comprising: mixing a conductive carbon in water with a branched chain polyethyleneimine (bPEI); mechanically dispersing the conductive carbon in association with the bPEI; preparing a precursor aqueous solution of at least one of a thiosulfate and a polysulfide; adding bPEI to the precursor aqueous solution; adding an organic acid to the precursor aqueous solution to precipitate elemental sulfur and obtain the sulfur particle; wherein the dispersed conductive carbon associated with bPEI is added to the precursor aqueous solution with the organic acid.

In one aspect of the second embodiment, the organic acid may be at least one of oxalic acid, malic acid, succinic acid, glutaric acid adipic acid and ascorbic acid.

In third embodiment, the present disclosure provides a cathode comprising the sulfur particles of the aspects of the first embodiment as an active material. In a further aspect, the areal sulfur loading of the cathode may be from 1.0 to 10 mg/cm$^2$.

In a fourth aspect, a battery comprising the cathode as described above is provided. In one aspect of this embodiment, the battery is a lithium-sulfur battery.

The present disclosure also includes a vehicle containing the battery according to the embodiments of the disclosure.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

DETAILED DESCRIPTION OF THE DISCLOSURE

Within the description of this disclosure, all cited references, patents, applications, publications and articles that are under authorship, joint authorship or ascribed to members of the Assignee organization are incorporated herein by reference. Where a numerical limit or range is stated, the endpoints are included. Also, all values and subranges within a numerical limit or range are specifically included as if explicitly written out. As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. According to the present disclosure, the term "chalcogen core" refers to a core containing elemental sulfur. As used herein, the term "vehicle" refers to any power driven device designed for transportation including an automobile, truck van, bus, golf cart and other utility forms of transportation.

The inventors are directing effort and resources to the study of materials useful to produce a battery of sufficient capacity and cycle lifetime to be competitive with and replace a combustion engine as a power source as well as other utilities requiring a high capacity, high cycle lifetime battery. In addition, a battery suitable for large scale intermittent energy storage will also be important for storage of green energy such as provided by wind and solar generation methods.

Thus in a first embodiment the present invention provides sulfur particle, comprising:

a core of elemental sulfur comprising homogeneously dispersed particles of a conductive carbon and branched polyethyleneimine; and a coating of branched polyethyleneimine (bPEI) encapsulating the core; wherein the dispersed particles of conductive carbon are associated with the bPEI of the elemental sulfur core.

The inventors have determined that the conductivity of the sulfur may be most efficiently and effectively increased by having particles of conductive carbon homogeneously dispersed within the sulfur.

Branched polyethyleneimine (bPEI) may be represented by the following formula:

-continued wherein under acid conditions the amino groups carry a degree of positive charge. As will be described in the description of the process to prepare the sulfur particles of the first embodiment, conductive carbon particles may be mechanically dispersed in an aqueous medium with mechanical or other high energy agitation such as sonication. Under the effect of this treatment, the conductive carbon particles become associated with the bPEI in such a manner that the Inventors consider the carbon particles are functionalized according to the chemical character of the bPEI. Thus as the pH of the aqueous medium is lowered, the positive charge density of the conductive carbon particles will increase to eventual saturation of free amino groups at low ph.

The degree of association or functionalization may be monitored by measurement of the zeta potential of the conductive carbon particles obtained. The inventors have discovered that to obtain good aqueous dispersion of the conductive carbon particles in the precipitated sulfur particles, the zeta potential of the bPEI-conductive carbon associative particles must be −35 mV or less, preferably 38 mV or less and most preferably 40 mV or less.

In contrast to the chemical oxidation method to functionalize the conductive carbon described in the Background discussion where treatment with nitric acid was employed to oxidize and functionalize the carbon particles, association with bPEI according to the present embodiment eliminates the use of strong, toxic inorganic acids and provides a simple, safe and effective mechanism to obtain conductive carbon particles homogeneously dispersible in elemental sulfur. Moreover, the method may be readily scaled to manufacturing quantity levels.

Thus, according to the method of manufacture described in the embodiments herein, elemental sulfur is formed and precipitated from a thiosulfate or polysulfide solution by addition of one or more organic acids in the presence of bPEI and conductive carbon particles associated with bPEI. Although any organic may be suitable, preferred acids may include any of oxalic acid, malic acid, succinic acid, glutaric acid, adipic acid and ascorbic acid.

The inventors have determined that when one of the above listed organic acids is employed as the precipitation agent, generally smaller elemental sulfur particles are obtained compared to the particles obtained with strong inorganic particles. The diameter of the sulfur particles may be from 200 to 1,000 nm.

Although not wishing to be bound by theory, the inventors believe formation and precipitation of the sulfur particles in the presence of bPEI-conductive carbon associated particles of sufficiently low zeta potential and in the presence of free bPEI with an organic acid provides the particles of the first embodiment where the bPEI-conductive carbon associated particles (also referred to as functionalized particles) are homogeneously dispersed in the precipitated sulfur core which is coated with bPEI.

As the weight % content of the bPEI-conductive carbon associated particles is increased in the precipitation medium the bPEI-conductive carbon associated particles become part of the coating of the sulfur particle and decorate the exterior coating layer.

Figure 8:
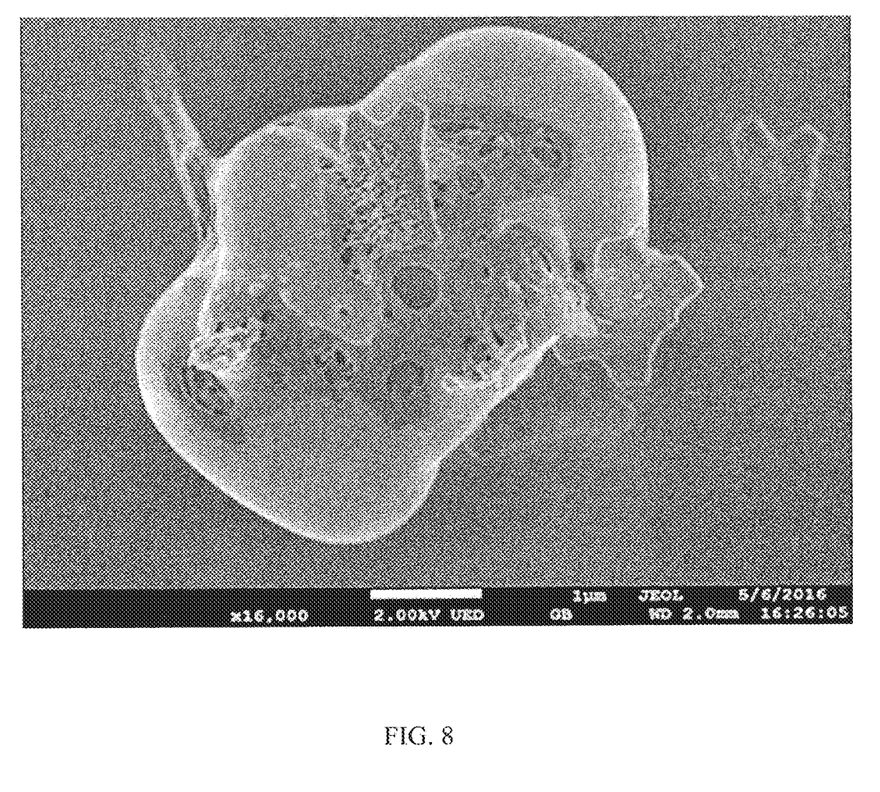
FIG. 8 shows a SEM image of partially coated sulfur particles formed by the reaction between sodium thiosulfate and oxalic acid in aqueous solution in the presence of deficient amount bPEI templating polymer and bPEI functionalized carbon.

FIG. 8 shows a SEM image of partially coated sulfur particles formed by the reaction between sodium thiosulfate and oxalic acid in aqueous solution in the presence of deficient amount bPEI templating polymer and bPEI functionalized carbon. In comparison to FIGS. 1, 2 and 3 where larger quantities of bPEI-conductive carbon associated particles and bPEI were used and the functionalized carbon was clearly visible on the outside of the sulfur particle when significantly lesser amounts of functionalized carbon are present, bPEI-conductive carbon associated particles were not visible.

Thus in an aspect of the first embodiment, the content of the conductive carbon in the elemental sulfur core in the form of bPEI-conductive carbon associated particles is from 0.01 to 1.0% by weight of a total weight of the elemental sulfur core, preferably 0.25 to 0.75% by weight and most preferably 0.4 to 0.6% by weight.

In a further aspect conductive carbon in the form of bPEI-conductive carbon associated particles may be on or within the bPEI coating. A total content of conductive carbon within the elemental sulfur core and on the bPEI coating is from 0.01 to 5.0% by weight of a total weight of the sulfur particle, preferably 0.5 to 2.0 weight % of the sulfur particle.

As described above the elemental sulfur particles may be formed from the reaction of sodium thiosulfate with an acid, such as oxalic acid, and one possible reaction equation to describe this process may be:

$$Na_2S_2O_3+(COOH)_2 \rightarrow Na_2(COO)_2+SO_2\uparrow+S\downarrow+H_2O$$

In specific aspects, the elemental sulfur particles obtained may have a sulfur content greater than 95% by weight depending on the amounts of bPEI-conductive carbon associated particles and bPEI.

A soluble precursor of sulfur may be a polysulfide such as potassium polysulfide as described in Example 3.

The disclosure is not limited to the particular chemistry described and any method to form and precipitate elemental sulfur in the presence of bPEI-conductive carbon associated particles and bPEI may be suitable.

In a second embodiment, the present disclosure provides an electrode, preferably a cathode containing the sulfur particles as described above. The cathode may be prepared by mixing the particles according to the above description with one or more binders and other materials conventionally employed to prepare a cathode structure. These materials may be mixed as a slurry, coated onto a metal foil, and dried. The methods of construction of a cathode employing an active material are conventionally known and any such method that is compatible with the particles of the disclosure may be employed.

The inventors have surprisingly discovered that cathodes having significantly higher areal loadings of elemental sulfur than conventionally employed may be prepared with the sulfur particles of the first embodiment. Thus, a cathode according to this embodiment may have a sulfur loading of from 1.0 mg S/cm² to 10 mg/cm², preferably 2.0 mg/cm² to 8.0 mg/cm² and most preferably, 3.0 mg/cm² to 5 mg/cm².

Suitable binders known to one of ordinary skill which are chemically stable in the potential window of use of the cell may include thermoplastics and thermosetting resins. For example, polyethylene, polypropylene, polytetrafluoroethylene (PTFE), polyvinylidene fluoride (PVDF), styrene butadiene rubber, a tetrafluoroethylene hexafluoro ethylene copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

In one special aspect of the second embodiment the binder may be a Nafion resin.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper. The areal amount of active ingredient, binder and conductive agent may be controlled by choice of draw bar or doctor blade selection. The applied material may then be pressed to a set thickness.

The conductive carbon material may be carbon black, such as Ketjen black, Super P, Super C65, Ensaco black and acetylene black, vapor grown carbon fiber, graphene, natural graphite, artificial graphite, such as Timrex SFG-6, Timrex SFG-15, Timrex SFG-44, Timrex KS-6, Timrex KS-15 and Timrex KS-44, fullerenes, hard carbon, mesocarbon microbeads and activated carbon.

In a special aspect of the second embodiment, a cathode having a content of the sulfur particles from 50 to 90% by weight; a content of the binder is from 2 to 10% by weight; and a content of the conductive carbon of from 0 to 30% by weight wherein the weight % is relative to a total weight of the active material is provided The cathode thus prepared may be employed in the construction of an electrochemical cell or battery in a conventionally known manner. In a preferred embodiment the cathode may be combined with an anode having a metal as an active material. The metal may be an alkali metal including lithium or sodium or an alkaline earth metal including magnesium.

In one embodiment the present disclosure provides a battery comprising a metal anode and a cathode comprising the hybrid particles according to the present disclosure. The metal may be selected from the alkali metals, alkaline earth metals or other metals suitable for utility in metal ion batteries. In a preferred aspect, the metal of the anode may be lithium.

Nonaqueous solvents suitable as an electrolyte include cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate include dimethyl carbonate, diethyl carbonate and methyl ethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethylene glycol dimethyl ether.

In one aspect the battery may be a lithium ion battery and the lithium electrolyte ion or mobile ion carrier may be any conventionally known to one of skill in the art and may include one or more of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$.

In another aspect a lithium-sulfur battery having a loading of sulfur on the cathode from 1.0 mg S/cm$^2$ to 10 mg/cm$^2$ is provided. In a further special aspect, a lithium-sulfur battery having a loading of sulfur on the cathode from 1.0 mg S/cm$^2$ to 10 mg/cm$^2$ preferably from 3.0 mg S/cm$^2$ to 5 mg/cm$^2$ is provided.

In further embodiments the present disclosure includes a vehicle containing the battery according to the present disclosure wherein the vehicle includes an automobile, truck van, bus, golf cart and other utility forms of transportation.

Having generally described this disclosure, a further understanding can be obtained by reference to certain specific examples which are provided herein for purposes of illustration only and are not intended to be limiting unless otherwise specified.

EXAMPLES

Polymer Functionalized Carbon

Ketjen Black® (75 mg ECP 600jd, LION) was put in a 500 ml conical flask with deionized water (250 mL). To a 40 ml vial was added 70 mg of bPEI and 25 ml of deionized water (this vial was sonicated for 1 hr and stirred for 1 hr) and was added to the conical flask. The conical flask containing the carbon was sonicated for 1 hr and stirred for 4 hrs followed by sonicating for 1 hr.

1) Synthesis of Sulfur Particles Embedded with Nanocarbon Coated with bPEI (200 mg bPEI)

Figure 1:
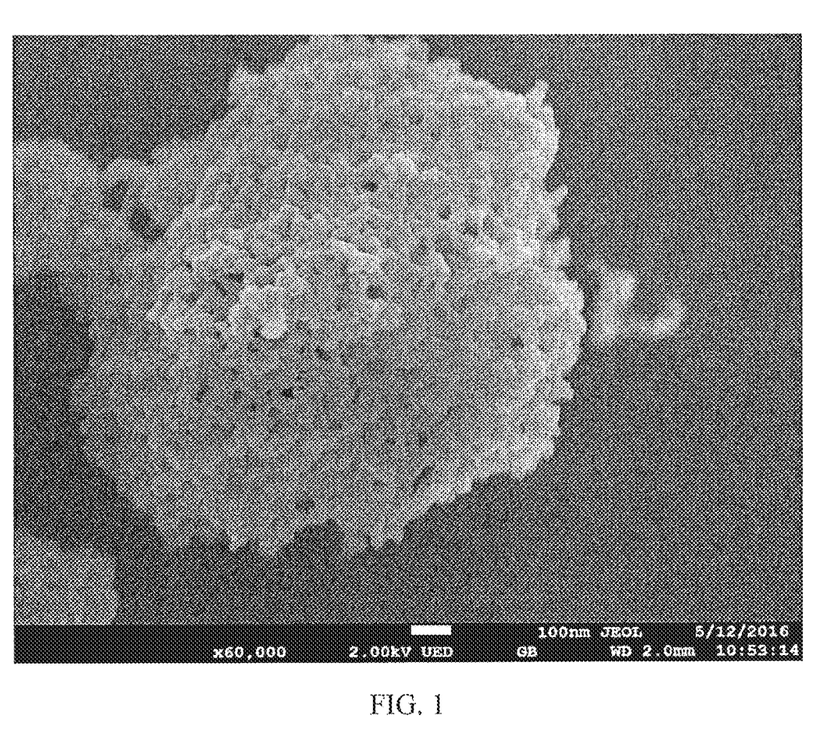
FIG. 1 shows a SEM image of sulfur particles embedded with Nano carbon coated with bPEI (200 mg bPEI) prepared in Example 1.

Sodium thiosulfate (50 g, 0.316 mol, $Na_2S_2O_3$, 99%, Reagent Plus®, Sigma-Aldrich) was dissolved in deionized water (1.5 L) in a 4 L beaker. bPEI (MW 10,000 Alfa Asear, 125 mg dissolved in 25 ml of water) was added to the sodium thiosulfate solution and stirred. Oxalic acid (157 g, 1.90 mol, $(COOH)_2$, >99.0%, Sigma-Aldrich) was dissolved in deionized water (2 L) in a 4 L beaker. The mole ratio of sodium thiosulfate and oxalic acid was 1:6. The polymer functionalized carbon (75 mg in 500 mL distilled water) was dispersed in the oxalic acid solution. This acidic solution was poured quickly into the sodium thiosulfate solution, and the solution color turned creamy gray. The solution was stirred rapidly at room temperature. After 3 hours, this solution was sonicated for 5 minutes. The precipitated sulfur particles were obtained by centrifugation at 1500 rpm for 10 minutes. The sulfur particles were rinsed in deionized water in order to remove the excess polymer on the particles. The rinsing procedure was repeated 5 times. FIG. 1 shows a scanning electron microscope (SEM) image of the particle obtained.

2) Synthesis of Sulfur Particles Embedded with Nanocarbon Coated with bPEI (250 mg bPEI)

Figure 2:
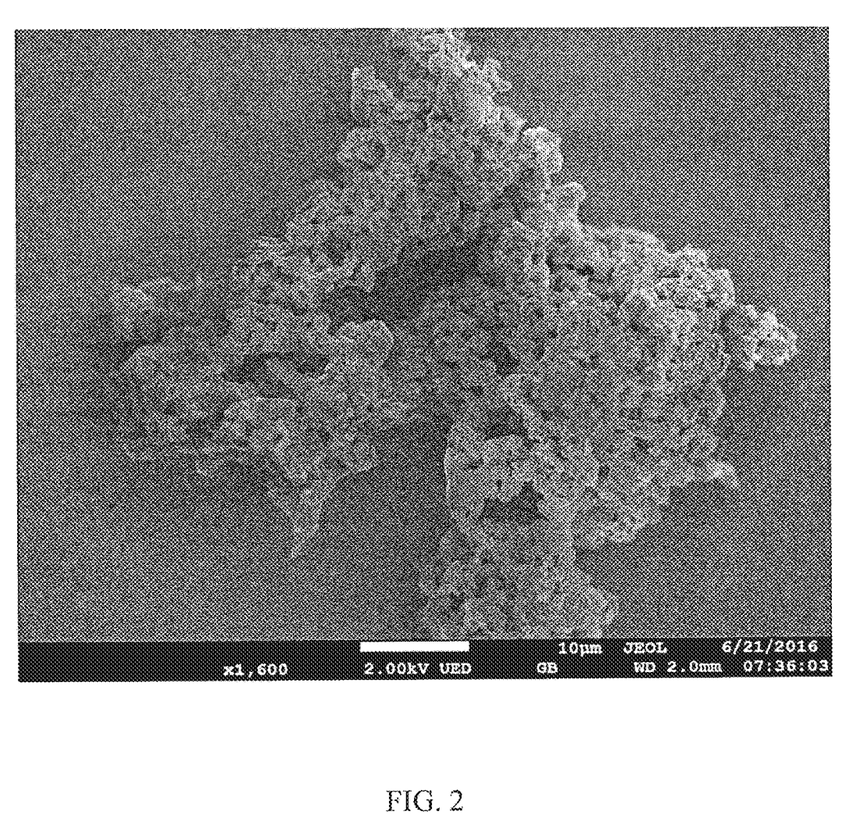
FIG. 2 shows a SEM image sulfur particles embedded with nanocarbon coated with bPEI (250 mg bPEI) prepared in Example 2.

Sodium thiosulfate (50 g, 0.316 mol, $Na_2S_2O_3$, 99%, Reagent Plus®, Sigma-Aldrich) was dissolved in deionized water (1.5 L) in a 4 L beaker. BPEI (MW 10,000 Alfa Asear, 125 mg dissolved in 25 ml of water) was added to the sodium thiosulfate solution and stirred. Oxalic acid (157 g, 1.90 mol, $(COOH)_2$, >99.0%, Sigma-Aldrich) was dissolved in deionized water (2 L) in a 4 L beaker. The mole ratio of sodium thiosulfate and oxalic acid was 1:6. The functionalized carbon (150 mg in 500 mL of distilled water) was dispersed in the oxalic acid solution. This acidic solution was poured quickly into the sodium thiosulfate solution, and the solution color turned creamy gray. The solution was stirred rapidly at room temperature. After 3 hours, this solution was sonicated for 5 minutes. The precipitated sulfur particles were obtained by centrifugation at 1500 rpm for 10 minutes. The sulfur particles were rinsed in deionized water in order to remove the excess polymer on the particles. The rinsing process was repeated for 5 times. FIG. 1. A sulfur particle that was obtained with 75 mg of functionalized bPEI carbon with a total amount of bPEI in the reaction of 200 mg. The functionalized carbon is formed by the addition of 75 mg of bPEI to 75 mg of Ketjen black 600JD. FIG. 2 shows a scanning electron microscope (SEM) image of the particle obtained.

3) Synthesis of Sulfur Particles Embedded with Nanocarbon Coated with bPEI from Potassium Polysulfide.

Figure 3:
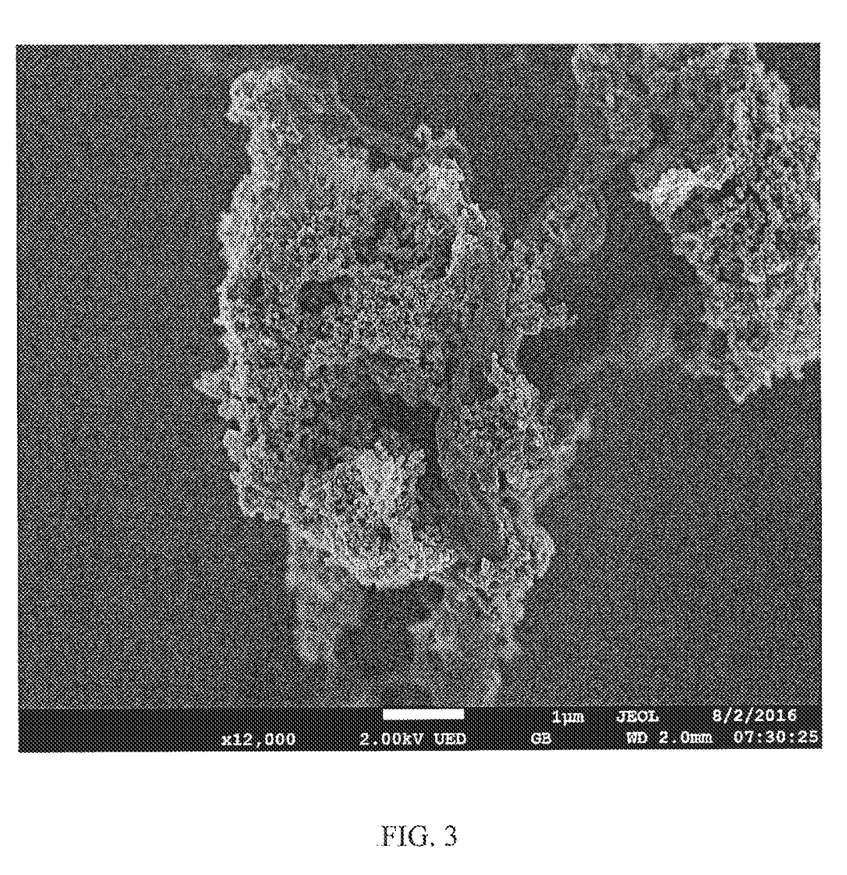
FIG. 3 shows a SEM image sulfur particles embedded with nanocarbon coated with bPEI prepared in Example 3.

200 g of potassium polysulfides from Sigma Aldrich were dissolved in 1.5 liters of deionized water and mixed with 1 g branched PEI (75 k MW) and 2 g Ketjen Black 600JD from Azko Nobel yielding a black solution. A clear solution of 400 g ascorbic acid dissolved in 2 liters deionized water was slowly added to this mixture. The color of the reaction mixture changed from dark black to slightly yellow, then bright yellow, followed by gradual darkening to a dark soft grey/blue. The reaction was allowed to proceed for 4 hours after which it was centrifuged (~800 rpm) and rinsed in 1 liter deionized water. FIG. 3 shows a SEM image of the particle obtained.

4) Cathode Preparation

A sulfur cathode sheet was formed by using doctor blade method on the top of aluminum foil (14 μm of thickness). A cathode slurry consisting of the active material (65%), conductive carbon powder (25%), and nafion binder (10%) dispersed in ethanol:water was prepared. The active material (0.4 g), carbon nanofiber (76.9 mg, CNF, Sigma-Aldrich), and Super P® (76.9 mg) were put in a 45 ml zirconia container with zirconia balls (40 g). This mixture was ball milled at 100 rpm for 1 hour. After an hour, the active material-carbon mixture was removed from the container.

500 mg of active material-carbon mixture, Nafion binder solution ((1.111 mg, Aldrich 70160), 100 ul of dry ethanol: water (1:1) were mixed in a mortar using a pestle for about 5 minutes. The active material-carbon mixture and nation binder were added to a white thinky cup and 1.2 ml of ethanol:water (1:1) was added. This slurry was kneaded in a planetary centrifugal mixer (ARE-310, THINKY) at 2000 rpm for 5 minutes following deformed process at 2200 rpm for 30 seconds. During this process, the viscosity of the slurry was adjusted by adding extra deionized water (up to 0.3 mL). After aluminum foil was defatted with acetone, the cathode slurry was coated on the aluminum foil with doctor blade. The gap of the blade was adjusted properly to the target sulfur areal loading; i.e. the gap of 450 μm was used to make 3.5 mg/cm² cathode. The coated cathode film was dried at 80° C. in drying oven overnight. The cathode was hot pressed at 60° C. to a thickness of 80 μm.

5) Electrochemical Characterization

Battery testing was conducted in a 2032 stainless coin type cell using DOL:DME (1:1, v/v) with 1 M LiTFSI and 0.2 M LiNO₃ electrolyte (solvents are dried over Li metal). The amount of electrolyte was approximately 210 μL. A cotton E cell separator was used as separator. A pretreated lithium metal disk was used as anode (16 mm) (see Treatment of Lithium metal for use as battery anode). The typical loading of sulfur was around ~3.5 mg/cm² and the diameter of the cathode was 19 mm. The battery performance was evaluated by galvanostatic cycling at 25° C. Charge and discharge rates were calculated assuming theoretical capacity for the total amount of sulfur in cathode. The rate of discharge and charge was 1 mA/cm². BioLogic SAS, model VMP3, multi-channel Science Instruments potentiostats were used for electrochemical measurements. Data were processed with EC-Lab Software V10.35 with the corresponding VMP3 firmware, provided by Science Instruments.

Figure 4:
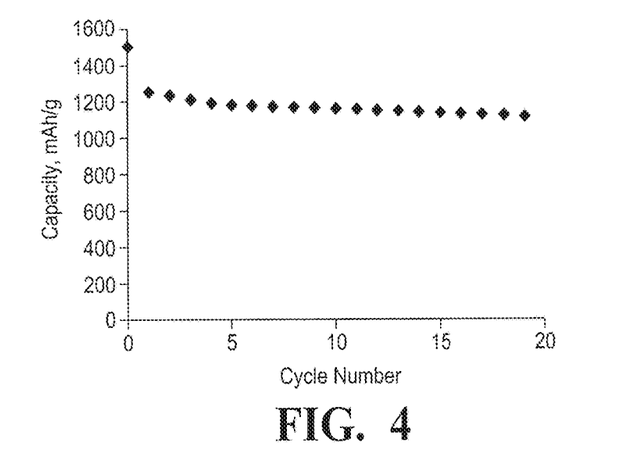
FIG. 4 shows the capacity change with cycle number for the coin cell prepared with the sulfur active material of Example 1.

FIG. 4 shows the capacity change with cycle number for the coin cell prepared with the sulfur active material of Example 1.

Figure 5:
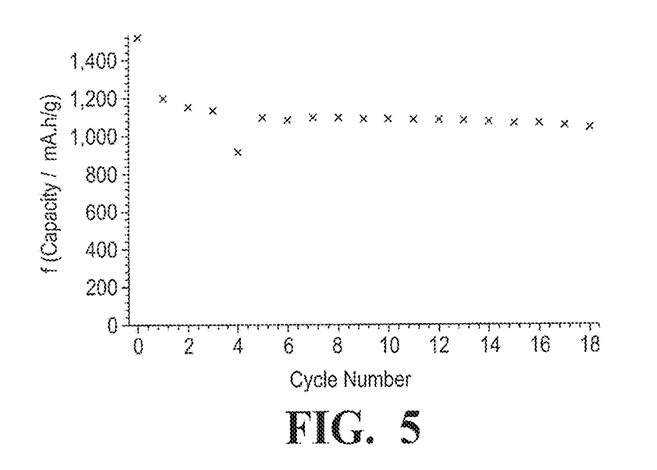
FIG. 5 shows the capacity change with cycle number for the coin cell prepared with the sulfur active material of Example 2.

FIG. 5 shows the capacity change with cycle number for the coin cell prepared with the sulfur active material of Example 2.

Figure 6:
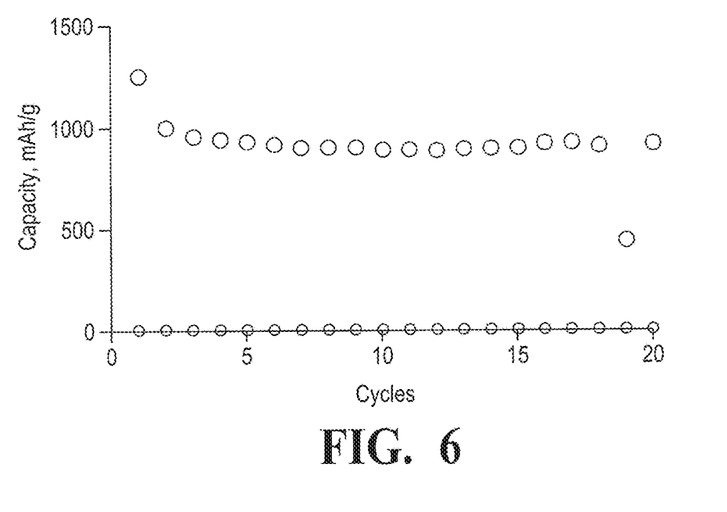
FIG. 6 shows the capacity change with cycle number for the coin cell prepared with the sulfur active material of Example 3.

FIG. 6 shows the capacity change with cycle number for the coin cell prepared with the sulfur active material of Example 3.

Figure 7:
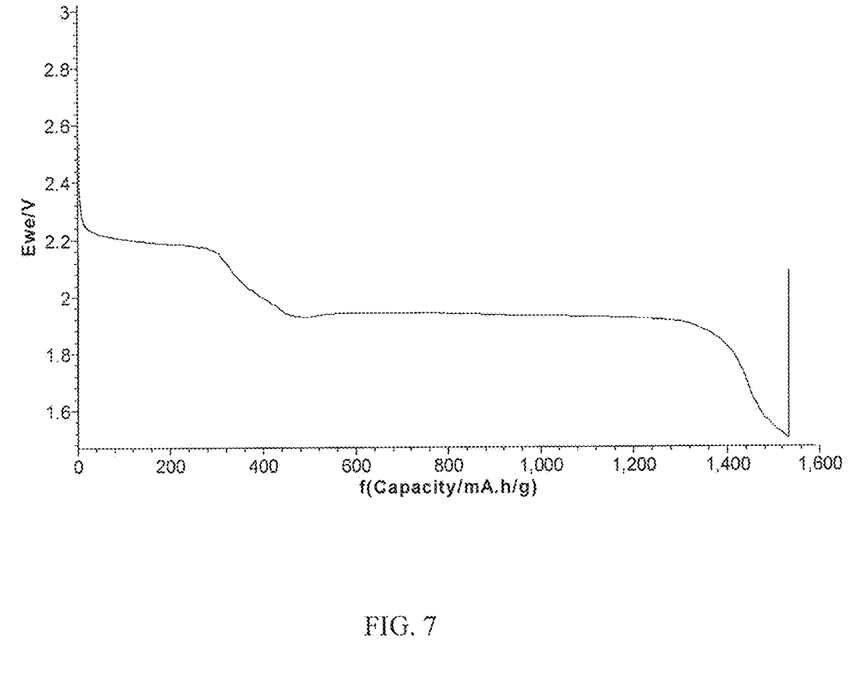
FIG. 7 shows the discharge capacity of a lithium sulfur battery prepared with the cathode active material prepared in Example 1.

FIG. 7 shows the discharge capacity of a lithium sulfur battery prepared with the sulfur active material of Example 1 discharged at a rate of C/4 where the sulfur loading is 65%. The discharge capacity approacheD the theoretical capacity of sulfur which is 1672 mAh/g.

Treatment of Lithium Metal for Use as Battery Anode

In a glovebox 1 mmol (0.0459 g) Li₂S was mixed with 0.625 mmol (0.1603 g) elemental sulfur (Ss) in 20 ml of a 1:1 solvent mixture of glyme and dioxolane (DME:DOL) to prepare a lithium polysulfide mixture of approximately 0.05 M according to the equation:

$$8Li_2S + 5S_8 \rightarrow 8Li_2S_6$$

The reaction was conducted within the glovebox at room temperature for 12 hours and a solution having a brown polysulfide color was obtained. A freshly scraped lithium disk was immersed in the lithium polysulfide solution for one hour in the glovebox and then rinsed with an ether solvent such as tetrahydrofuran (THF), glyme or dioxolane. The foil was allowed to dry in the glovebox and then removed to prepare a coin cell.

The invention claimed is:

1. A sulfur particle, comprising:
   a core of elemental sulfur comprising particles homogeneously dispersed within the core; and
   a coating of branched polyethyleneimine (bPEI) encapsulating the core;
   wherein the homogeneously dispersed particles comprise a conductive carbon and branched polyethyleneimine.

2. The sulfur particle of claim 1, wherein a content of the conductive carbon in the elemental sulfur core is from 0.01 to 1.0% by weight of a total weight of the elemental sulfur core.

3. The sulfur particle of claim 1, further comprising conductive carbon on the bPEI coating.

4. The sulfur particle of claim 3, wherein a total content of conductive carbon within the elemental sulfur core and on the bPEI coating is from 0.01 to 5.0% by weight of a total weight of the sulfur particle.

5. The sulfur particle of claim 1 wherein a diameter of the core of elemental sulfur is from 200 to 1,000 nm.

6. The sulfur particle of claim 1 wherein the conductive carbon is a carbon black.

7. A method for preparing the sulfur particle of claim 1, comprising: mixing a conductive carbon in water with a branched chain polyethyleneimine (bPEI); mechanically dispersing the conductive carbon in association with the bPEI; preparing a precursor aqueous solution of at least one of a thiosulfate and a polysulfide; adding bPEI to the precursor aqueous solution; adding an organic acid to the precursor aqueous solution to precipitate elemental sulfur and obtain the sulfur particle; wherein the dispersed conductive carbon associated with bPEI is added to the precursor aqueous solution with the organic acid.

8. The method of claim 7, wherein the organic acid is at least one selected from the group consisting of oxalic acid, malic acid, succinic acid, glutaric acid adipic acid and ascorbic acid.

9. The method of claim 7, wherein a zeta potential of the conductive carbon in association with the bPEI is less than −35 mV.

10. A cathode comprising:
a conductive substrate, and
an active material comprising the sulfur particles of claim 1.

11. The cathode of claim 10, wherein the active material further comprises:
a binder; and
a conductive carbon.

12. The cathode of claim 11, wherein
a content of the sulfur particles is from 50 to 90% by weight;
a content of the binder is from 2 to 10% by weight; and
a content of the conductive carbon is from 0 to 30% by weight;
wherein the weight % is relative to a total weight of the active material.

13. A battery comprising:
an anode comprising lithium; and
the cathode of claim 12;
wherein
a loading of sulfur is from 1.0 mg S/cm$^2$ to 10 mg/cm$^2$.

14. The cathode of claim 11 wherein the binder is a Nafion copolymer.

15. The cathode of claim 11, wherein the conductive carbon is at least one selected from the group consisting of carbon black, acetylene black, vapor grown carbon fiber, graphene, natural graphite, artificial graphite, fulierenes, hard carbon, mesocarbon microbeads and activated carbon.

16. The cathode of claim 10, wherein
a loading of sulfur is from 1.0 mg S/cm$^2$ to 10 mg/cm$^2$.

17. The cathode of claim 10, wherein
a loading of sulfur is from 3.0 mg S/cm$^2$ to 5 mg/cm$^2$.

18. A battery, comprising:
an anode comprising a metal as an active source of metal ions, and
the cathode of claim 10.

19. The battery of claim 18, wherein
the metal of the anode is lithium, and
a loading of sulfur is from 1.0 mg S/cm$^2$ to 10 mg/cm$^2$.

20. The battery of claim 19, wherein
the loading of sulfur is from 3.0 mg S/cm$^2$ to 5 mg/cm$^2$.

* * * * *